(12) United States Patent
Pan et al.

(10) Patent No.: US 9,203,297 B2
(45) Date of Patent: Dec. 1, 2015

(54) AC/DC CONVERTER AND METHOD OF CORRECTING POWER FACTOR

(71) Applicant: HEP TECH CO., LTD., Taichung (TW)

(72) Inventors: Ching-Tsai Pan, Hsinchu (TW); Po-Yen Chen, Taipei (TW); Ta-Sheng Hung, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 169 days.

(21) Appl. No.: 14/096,796

(22) Filed: Dec. 4, 2013

(65) Prior Publication Data

US 2014/0153306 A1 Jun. 5, 2014

(30) Foreign Application Priority Data

Dec. 5, 2012 (TW) .............................. 101145615 A

(51) Int. Cl.
*H02M 1/42* (2007.01)
*H02M 3/156* (2006.01)
*H02M 3/155* (2006.01)

(52) U.S. Cl.
CPC .......... *H02M 1/4208* (2013.01); *H02M 1/4225* (2013.01); *H02M 1/4241* (2013.01); *H02M 1/4266* (2013.01); *H02M 3/156* (2013.01); *H02M 2003/1557* (2013.01); *Y02B 70/123* (2013.01)

(58) Field of Classification Search
CPC ... H02M 1/42; H02M 1/4241; H02M 1/4208; H02M 1/4225; H02M 3/156; H02M 2003/1557
USPC .............. 363/81, 82; 323/271, 282, 284, 288, 323/290
See application file for complete search history.

(56) References Cited

U.S. PATENT DOCUMENTS

| | | | | |
|---|---|---|---|---|
| 5,598,326 | A | * | 1/1997 | Liu et al. .......................... 363/34 |
| 6,107,753 | A | * | 8/2000 | Qian .............................. 315/247 |
| 6,118,225 | A | * | 9/2000 | Wessels ......................... 315/247 |
| 7,061,212 | B2 | * | 6/2006 | Phadke .......................... 323/222 |
| 2005/0218828 | A1 | * | 10/2005 | Busse et al. ..................... 315/224 |
| 2010/0202173 | A1 | * | 8/2010 | Storm et al. .................... 363/126 |
| 2010/0265231 | A1 | * | 10/2010 | Jang ............................... 345/211 |
| 2011/0132899 | A1 | * | 6/2011 | Shimomugi et al. ........... 219/620 |
| 2011/0317450 | A1 | * | 12/2011 | Cheng et al. .................... 363/20 |

* cited by examiner

*Primary Examiner* — Jessica Han
*Assistant Examiner* — David A Singh
(74) *Attorney, Agent, or Firm* — WPAT, PC; Justin Yang

(57) ABSTRACT

An AC/DC converter includes a rectifier circuit and an active power factor correction circuit. The rectifier circuit is electrically connected to a power supply, and is used to convert an alternate current into a direct current, wherein the rectifier circuit has a positive output and a negative output for sending out the direct current. The active power factor correction circuit electrically connects the rectifier circuit and a loading, wherein the active power factor correction circuit is used to suppress voltage ripples provided to the loading.

10 Claims, 7 Drawing Sheets

AC/DC CONVERTER AND METHOD OF CORRECTING POWER FACTOR

The current application claims a foreign priority to the patent application of Taiwan No. 101145615 filed on Dec. 5, 2012.

BACKGROUND OF THE INVENTION

1. Technical Field

The present invention relates generally to a converter, and more particularly to an AC/DC converter and method of correcting power factor.

2. Description of Related Art

Typically, an AC/DC converter is used to convert an alternate current (AC) into a direct current (DC). FIG. 1 shows a conventional AC/DC converter, which includes a rectifier circuit 300 and an output capacitor C. The rectifier circuit 300 converts an alternate current (AC) of an AC power supply into a direct circuit (DC), and the output capacitor C bridges over the outputs of the rectifier circuit 10 and are connected to a loading 400 in parallel. While the AC/DC converter is working, the phases of the input voltage and the input current of the AC are different, which leads to low power factor and poor total harmonic distortion. In addition, the output capacitor C is charged only when the direct current has higher voltage than the output capacitor C, hence the charging time of the output capacitor C is shortened. As a result, the conduction time of diodes in the rectifier circuit 300 is also shortened, which increases the peak value of the conduction current, distorts the waveform of the input current, and lowers the power factor. Low power factor not only wastes energy, but also poses unnecessary burdens for the power supply systems of the power company. Therefore, the AC/DC converter with power factor correction circuit is emerged.

Typically, a conventional power factor correction circuit for AC/DC converters has two types, which are active type and passive type. Active power factor correction circuits control the input current with active switch components, and this type of power factor correction circuits has several advantages, such as the power factor could excess 0.99, and the total harmonic distortion could be less than 10%. And moreover, active power factor correction circuit is compatible with wider range of input voltage, generates stable output voltage, and it's unaffected by the variation of output power. However, active power factor correction circuit has several main drawbacks too, such as higher cost due to additional active switch components required, high electromagnetic noises, and low durability. The industry is eager to overcome these drawbacks. Besides, in order to reduce the ripple of the output voltage of the loading 400, the aforementioned output capacitor C has to adopt a high capacity electrolytic capacitor, but the electrolytic capacitor is easy to leak out the contained electrolyte due to being heated for a long period of time, which shortens life of circuit.

BRIEF SUMMARY OF THE INVENTION

In view of the above, the primary objective of the present invention is to provide an AC/DC converter and a method of correcting power factor, which effectively increases the power factor, and suppresses voltage ripples provided to a loading.

The present invention provides an AC/DC converter for converting an alternate current (AC) of a power supply into a direct current (DC), and the DC is transmitted to a loading, which includes a rectifier circuit and an active power factor correction circuit, wherein the rectifier circuit is electrically connected to the power supply to convert the AC into the DC, which has a positive output and a negative output for outputting the DC; the active power factor correction circuit electrically connects the rectifier circuit to the loading, which is used to suppress voltage ripples provided to the loading, and includes a first diode, a second diode, a third diode, a first inductor, a second inductor, a first capacitor, a switch, a fourth diode, a third inductor, a second capacitor, and a third capacitor, wherein the first diode has an anode and a cathode, wherein the cathode of the first diode is connected to the positive output of the rectifier circuit; the second diode has an anode and a cathode, wherein the anode of the second diode is connected to the negative output of the rectifier circuit; the third diode has an anode and a cathode, wherein the anode of the third diode is connected to the anode of the first diode; the first inductor has two ends, one of which is connected to both the cathode of the first diode and the positive output of the rectifier circuit; the second inductor has an end connected to the cathode of the second diode and an opposite end connected to the anode of the first diode and the anode of the third diode; the first capacitor has an end connected to the first inductor and an opposite end connected to the second inductor, the anode of the first diode and the anode of the third diode; the switch has an end connected to both the first inductor and the first capacitor and an opposite end connected to both the negative output of the rectifier circuit and the anode of the second diode; the fourth diode has an anode and a cathode, wherein the anode of the fourth diode is connected to both the cathode of the second diode and the second inductor, and the cathode thereof is connected to the cathode of the third diode; the third inductor has an end connected to both the cathode of the third diode and the cathode of the fourth diode; the second capacitor has an end connected to both the cathode of the third diode and the cathode of the fourth diode and an opposite end connected to the third inductor; the third capacitor has an end connected to both the third inductor and the second capacitor and an opposite end connected to the cathode of the second diode, the second inductor and the anode of the fourth diode, wherein the third capacitor is connected to the loading in parallel.

According to the aforementioned concepts, the present invention further provides a method of correcting power factor with an active power factor correction circuit, wherein the active power factor correction circuit includes a first diode, a second diode, a third diode, a first inductor, a second inductor, a first capacitor, a switch, a fourth diode, a third inductor, a second capacitor, and a third capacitor, wherein the first diode has an anode and a cathode, wherein the cathode of the first diode is connected to the positive output of the rectifier circuit; the second diode has an anode and a cathode, wherein the anode of the second diode is connected to the negative output of the rectifier circuit; the third diode has an anode and a cathode, wherein the anode of the third diode is connected to the anode of the first diode; the first inductor has two ends, one of which is connected to both the cathode of the first diode and the positive output of the rectifier circuit; the second inductor has an end connected to the cathode of the second diode and an opposite end connected to the anode of the first diode and the anode of the third diode; the first capacitor has an end connected to the first inductor and an opposite end connected to the second inductor, the anode of the first diode and the anode of the third diode; the switch has an end connected to both the first inductor and the first capacitor and an opposite end connected to both the negative output of the rectifier circuit and the anode of the second diode; the fourth diode has an anode and a cathode, wherein the anode of the fourth diode is connected to both the cathode of the second diode and the second inductor, and the cathode thereof is connected to the cathode of the third diode; the third inductor has an end connected to both the cathode of the third diode and the cathode of the fourth diode; the second capacitor has an end connected to both the cathode of the third diode and the cathode of the fourth diode and an opposite end connected to the third inductor; the third capacitor has an end connected to both the third inductor and the second capacitor and an opposite end connected to the cathode of the second diode, the second inductor and the anode of the fourth diode, wherein the third capacitor is connected to the loading in parallel; the method includes the steps of:

A. Conduct the switch to let the DC power supply charge the first inductor with a DC, the first capacitor charge the second inductor to make the second inductor have a stored energy, and the third inductor, the second inductor and the third inductor provide energy to the loading;

B. Cut off the switch and conduct the first diode to let the first inductor provide energy to the first capacitor, and keep transmitting the stored energy of the second inductor to the third capacitor;

C. Conduct the fourth diode to let the second capacitor and the third inductor provide energy to the third capacitor to provide energy into the loading;

D. Keep providing energy from the second capacitor and the third inductor to the third capacitor to provide energy into the loading as the first diode is cut off after the first inductor finishing providing energy to the first capacitor.

With such design, it may effectively increase the power factor of the AC/DC converter, and suppress voltage ripples provided to the loading.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
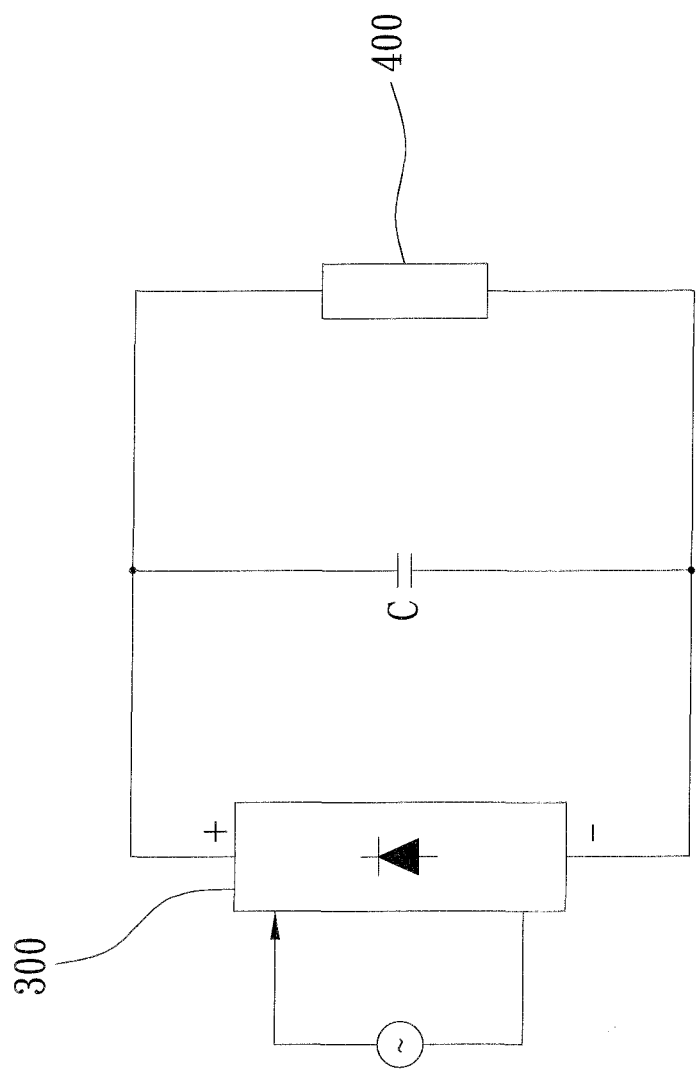
FIG. 1 is a circuit diagram of the conventional AC/DC converter.
Figure 2:
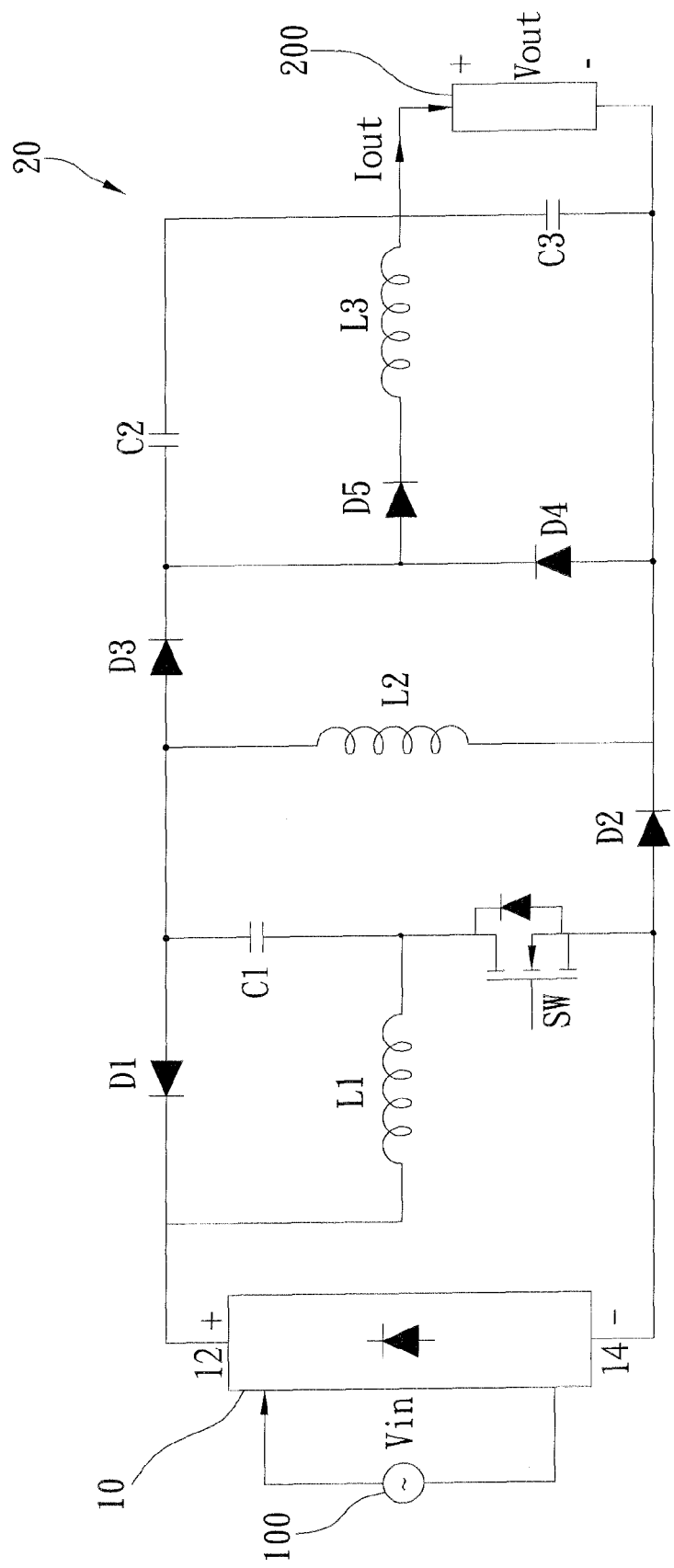
FIG. 2 is a circuit diagram of a preferred embodiment of the present invention.

As shown in FIG. 2, an AC/DC converter of the preferred embodiment of the present invention is used to convert an alternate current (AC) provided by a power supply 100 into a direct current (DC), and send the DC to a loading 200. The AC/DC converter includes a rectifier circuit 10 and an active power factor correction circuit 20.

The rectifier circuit 10 is electrically connected to the power supply 100, to convert the AC of the power supply 100 into the DC, wherein the rectifier circuit 10 has a positive output 12 and a negative output 14 for sending out the DC.

The active power factor correction circuit 20 electrically connects the rectifier circuit 10 to the loading 200 to improve the power factor and suppress voltage ripples provided to the loading 200. The active power factor correction circuit 20 include five diodes (a first diode D1, a second diode D2, to a fifth diode D5), three inductors (a first inductor L1, a second inductor L2, and a third inductor L3), three capacitors (a first capacitor C1, a second capacitor C2, and a third capacitor C3), and a switch SW. A cathode of the first D1 is connected to the positive output 12 of the rectifier circuit 10. An anode of the second diode D2 is connected to the negative output 14 of the rectifier circuit 10. An anode of the third diode D3 is connected to an anode of the first diode D1. An end of the first inductor L1 is connected to the cathode of the first diode D1 and the positive output 12 of the rectifier circuit 10. An end of second inductor L2 is connected to a cathode of the second diode D2, and the other end thereof is connected to the anode of the first diode D1 and the anode of the third diode D3. The first capacitor C1 is a non-polarity capacitor, and an end thereof is connected to the first inductor L1, and the other end thereof is connected to the second inductor L2, the anode of the first diode D1, and the anode of the third diode D3. An end of the switch SW is connected to the first inductor L1 and the first capacitor C1, and another end thereof is connected to the negative output 14 of the rectifier circuit 10 and the anode of the second diode D2. An anode of the fourth diode D4 is connected to the cathode of the second diode D2 and the second inductor L2, and a cathode thereof is connected to the cathode of the third diode D3. An anode of the fifth diode D5 is connected to the cathode of the third diode D3 and a cathode of the fourth diode D4. An end of the third inductor L3 is electrically connected to the cathode of the fourth diode D4. The second capacitor C2 is a non-polarity capacitor, and an end thereof is connected to the cathode of the third diode D3 and the cathode of the fourth diode D4, and the other end thereof is connected to the third inductor L3. The third capacitor C3 is a non-polarity capacitor, and is connected to the loading 200 in parallel. An end of the third capacitor C3 is connected to the third inductor L3 and the second capacitor C2, and the other end thereof is connected to the cathode of the second diode D2, the second inductor L2, and the anode of the fourth diode D4.

Table 1 shows the specs of the capacitors C1-C3, the inductors L1-L3, an input voltage $V_{in}$ provide by the power supply 100, an output voltage $V_{out}$ flows through the loading 200, a switching frequency of the switch SW, and a resistance of the loading 200:

TABLE 1

| | |
|---|---|
| First inductor L1 | 60 μH |
| Second inductor L2 | 220 μH |
| Third inductor L3 | 68 μH |
| First capacitor C1 | 100 μF |
| Second capacitor C2 | 22 nF |
| Third capacitor C3 | 1 μF |
| Input voltage $V_{in}$ | 110 V |
| Output voltage $V_{out}$ | 12 V |
| Switching frequency | 100 KHz |
| Resistance of the loading 200 | 5 Ω |

Figure 3:
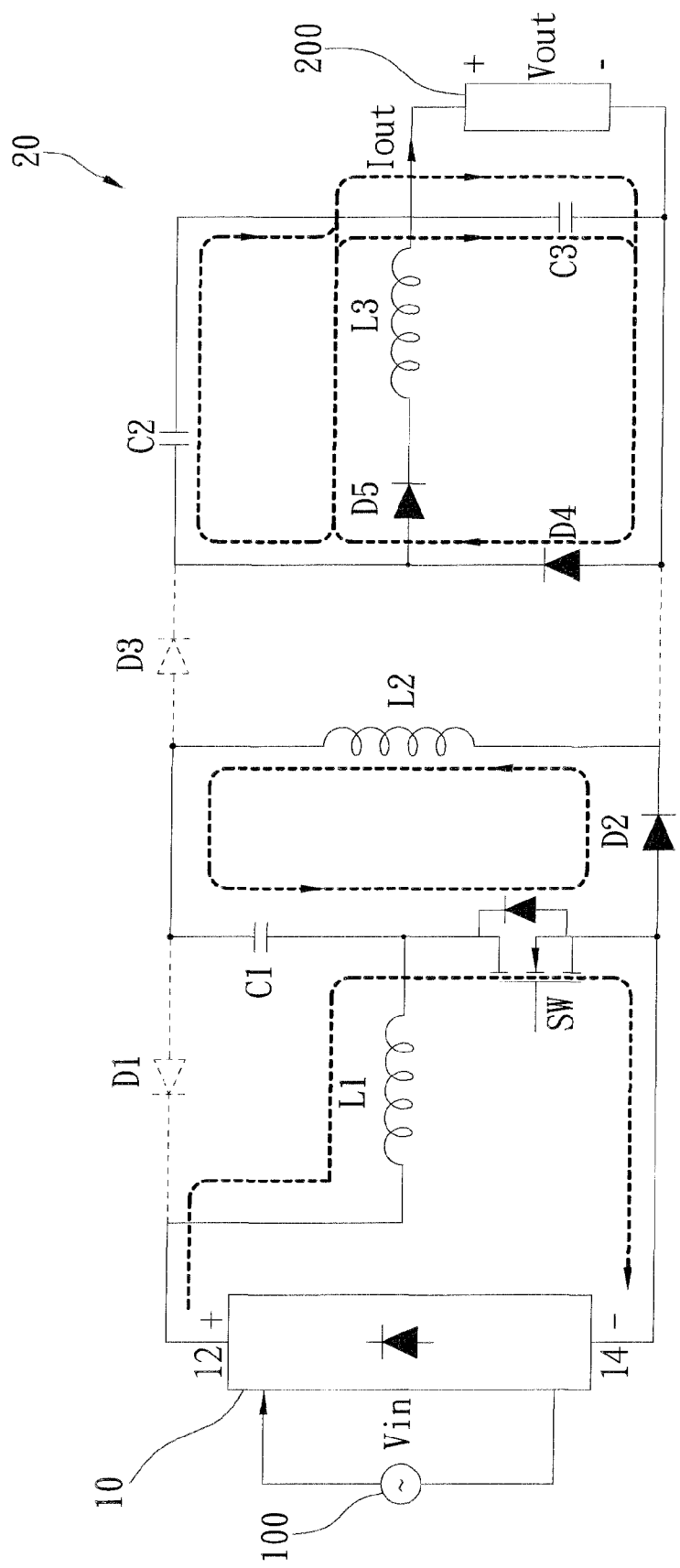
FIG. 3 to FIG. 6 are the circuit diagrams of the preferred embodiment of the present invention, showing how the AC/DC converter works in different steps.

With the aforementioned design and specifications, the active power factor correction circuit 20 may use a method to correct power factor after receiving the DC sent from the rectifier circuit 10, which effectively increases the power factor and suppress voltage ripples provided to the loading 200, wherein the method includes the following steps:

A. Conduct the switch SW to let the rectifier circuit 10 charge the first inductor L1 with the DC, the first capacitor C1 charge the second inductor L2 to make the second inductor L2 have a stored energy, and the third inductor L3, the second inductor L2 and the third inductor L3 provide energy to the loading 200, as shown in FIG. 3.

Figure 4:
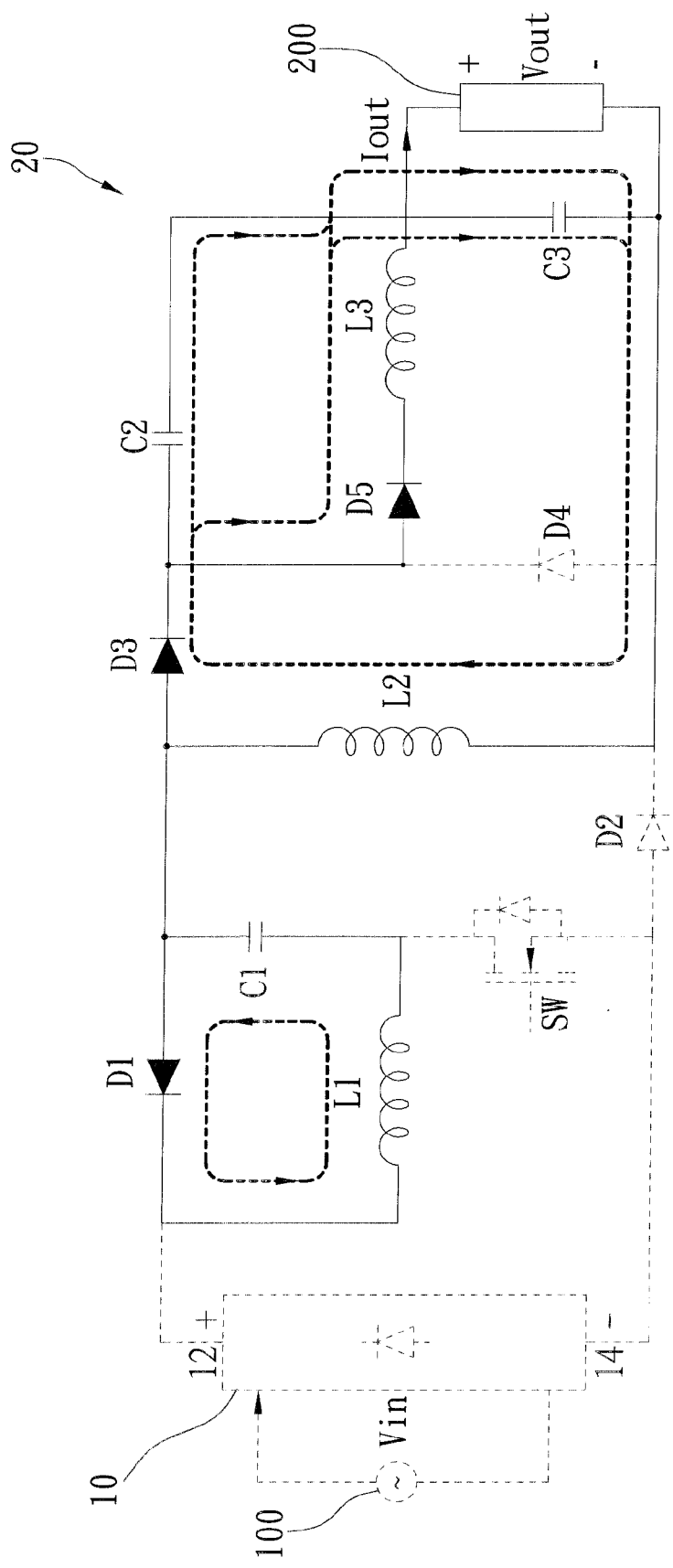

B. Cut off the switch SW and conduct the first diode D1 to let the first inductor L1 provide energy to the first capacitor C1, and keep transmitting the stored energy of the second inductor L2 to the third capacitor C3 through a resonant circuit formed by the second capacitor C2 and the third inductor L3, as shown in FIG. 4. As a result, the third capacitor C3 provides energy into the loading 200, and a voltage drop of the second capacitor C2 gets reversed.

Figure 5:
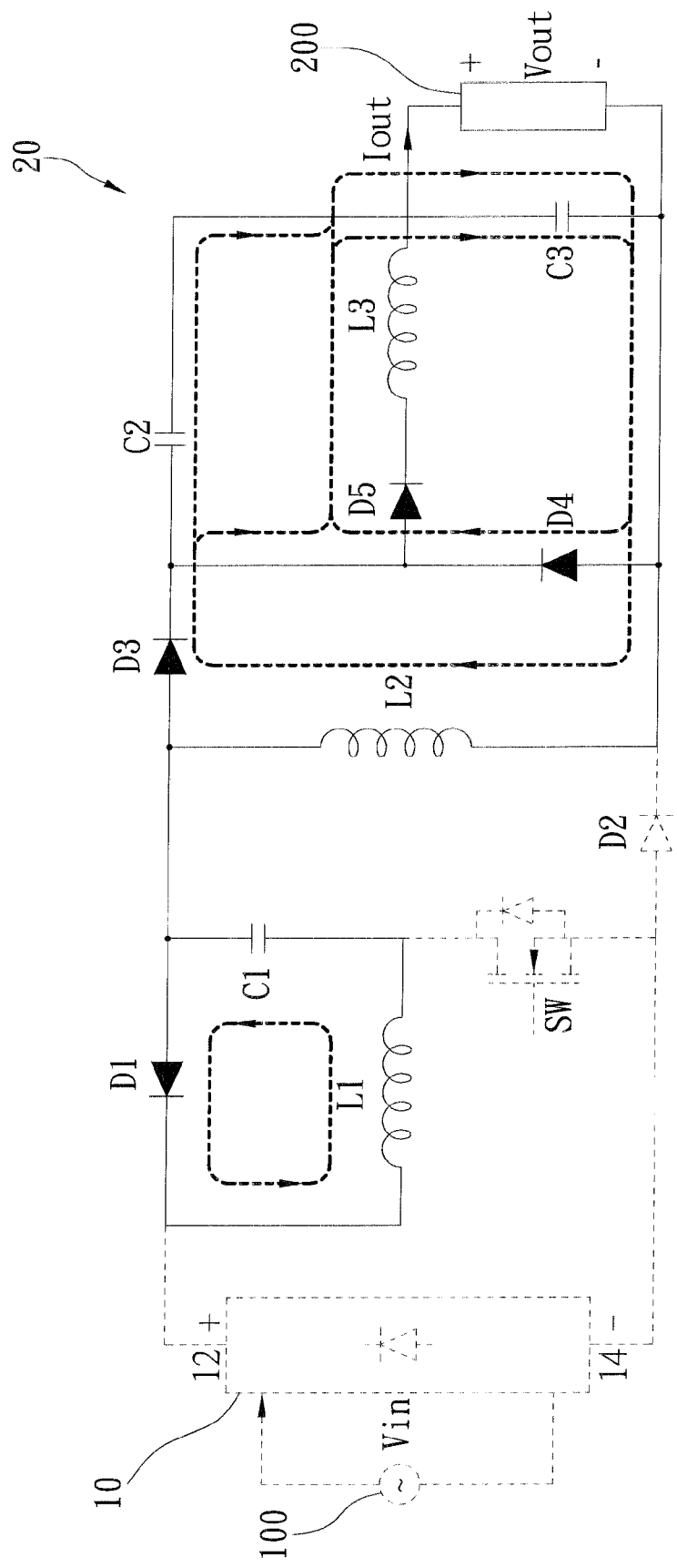

C. Please refer to FIG. 5, when a voltage drop of the third inductor L3 is higher than a voltage drop of the third capacitor C3, the fourth diode D4 is conducted to let voltage drops of the second capacitor C2, the third inductor L3, and the third capacitor C3 equal, and let the second capacitor C2 and the third inductor L3 provide energy to the third capacitor C3 to provide energy into the loading 200. In addition, the first inductor L1 keeps providing energy to the first capacitor C1.

Figure 6:
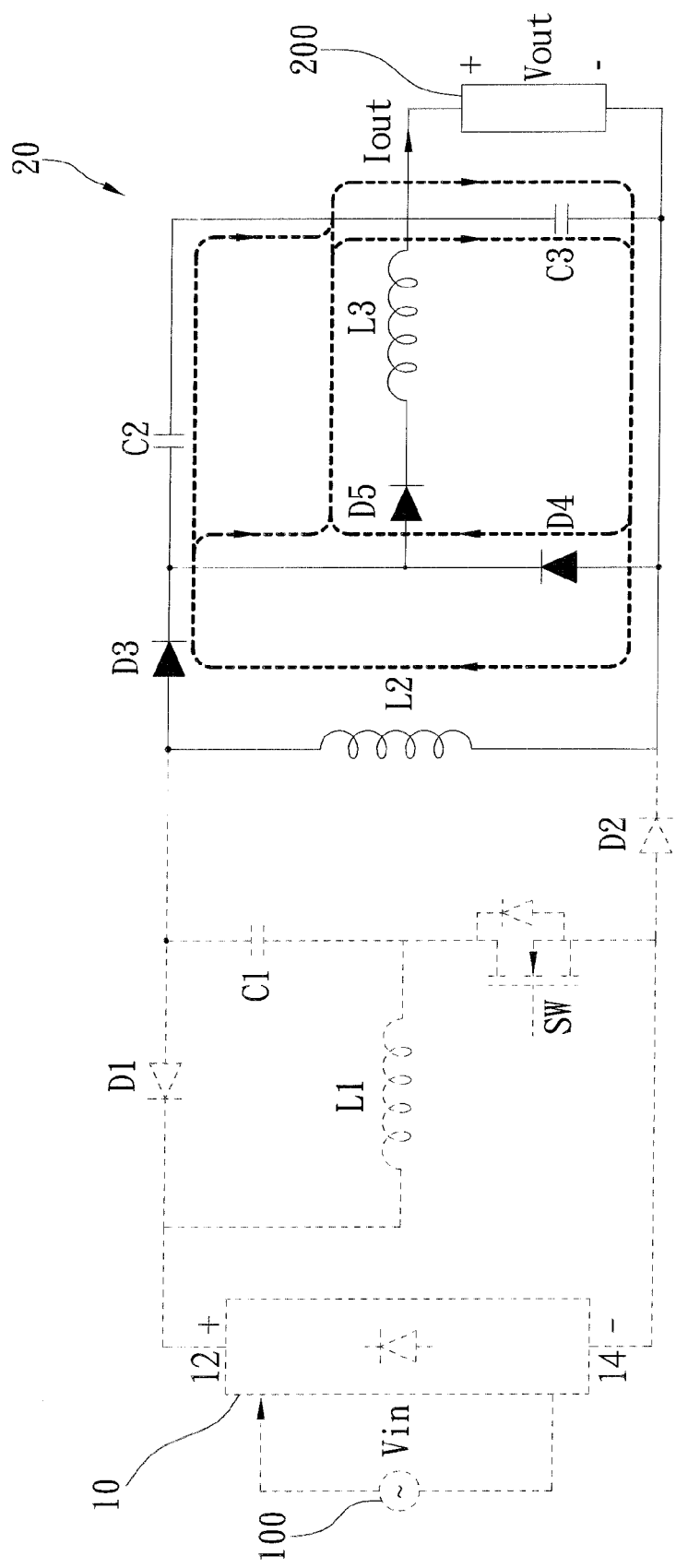

D. Keep providing energy from the second capacitor C2 and the third inductor L3 to the third capacitor C3 to provide energy into the loading 200 as the first diode D1 cuts off after the first inductor L1 finishing providing energy to the first capacitor C1, as shown in FIG. 6.

Every time the method executes from the step A to the step D, it is defined as one cycle. Therefore, while the AC/DC converter is working, the step A to the step D are proceeded repeatedly until the AC/DC converter stops working.

Figure 7:
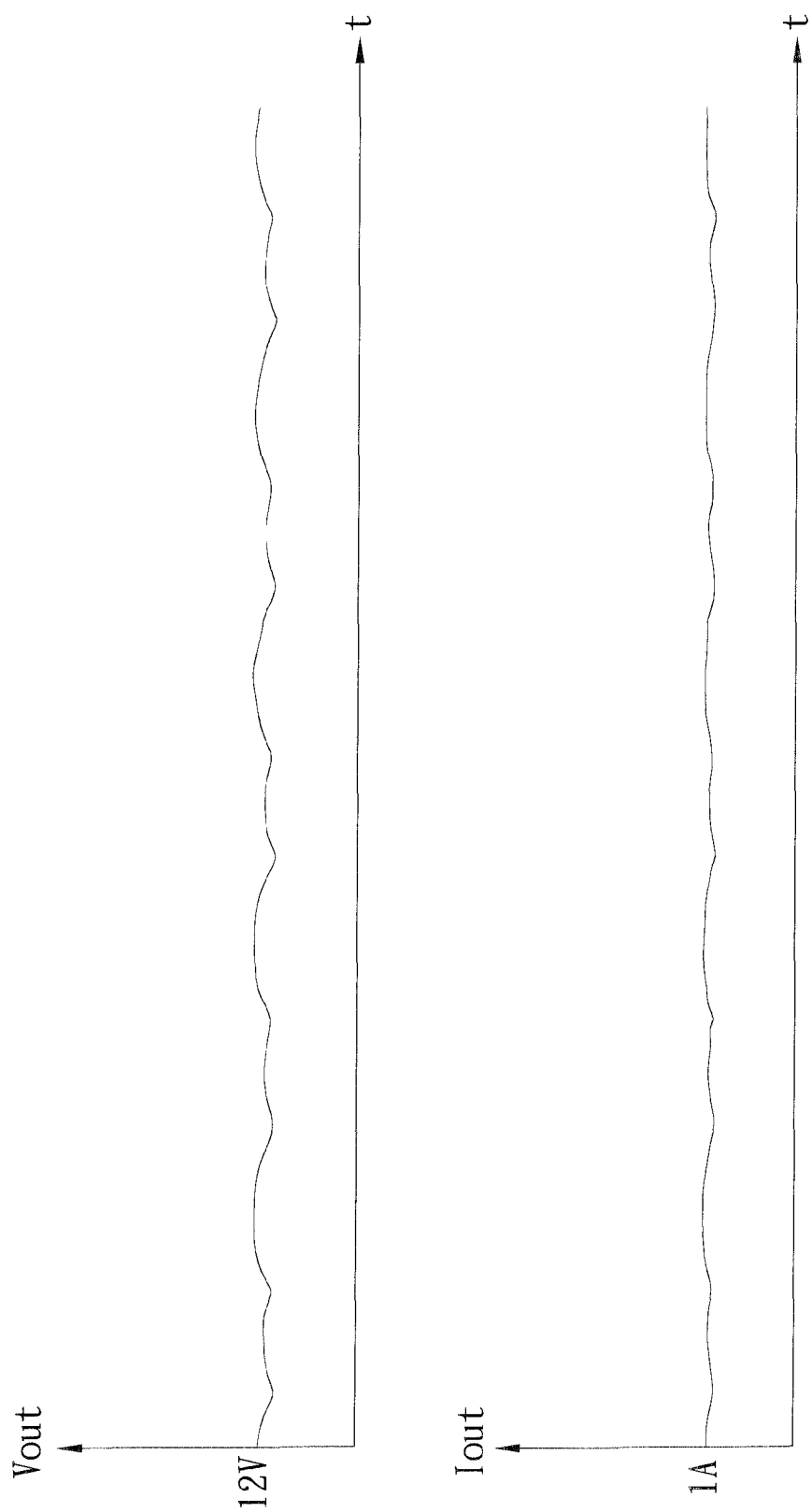
FIG. 7 is an oscillogram of the output voltage and the output current.

Please refer to FIG. 7, the high-frequency ripple is merely about 0.9V when the output voltage is 12V in the present preferred embodiment. In other words, with the aforementioned design of structures and methods, the power factor of the conventional circuit could be increased, and furthermore, the output voltage ripple caused by every increased input energy (which is, when the switch SW is conducted) could be suppressed, due to the third inductor L3 has a circuit capable of storing energy and filtering at the same time. Besides, by switching the active switch SW, and with the resonant between the third inductor L3 and the second capacitor C2, the stored energy in voltage of the second capacitor C2 could be converted into inductive current, and the polarity of the voltage drop of the second capacitor C2 could be reversed, which changes the whole circuit structure of the fourth diode D2 after it being conducted. In this way, the output voltage ripple caused by stopping providing energy (which is, when the switch SW cuts off) could be suppressed.

Furthermore, the fifth diode D5 could effectively prevent the circuit around the loading 200 from having a back flow, which stables the whole circuit to increase the power factor of the AC/DC converter and suppress the ripples. Of course, the ripples could be suppressed in practice even without the fifth diode D5.

It must be pointed out that the embodiments described above are only some preferred embodiments of the present invention. All equivalent structures and methods which employ the concepts disclosed in this specification and the appended claims should fall within the scope of the present invention.

What is claimed is:

1. An AC/DC converter for converting an alternate current (AC) of a power supply into a direct current (DC), and the DC is transmitted to a loading, comprising:
    a rectifier circuit, which is electrically connected to the power supply to convert the AC into the DC, having a positive output and a negative output for outputting the DC; and
    an active power factor correction circuit electrically connecting the rectifier circuit to the loading to suppress voltage ripples provided to the loading, the active power factor correction circuit comprising:
        a first diode having an anode and a cathode, wherein the cathode of the first diode is connected to the positive output of the rectifier circuit;
        a second diode having an anode and a cathode, wherein the anode of the second diode is connected to the negative output of the rectifier circuit;
        a third diode having an anode and a cathode, wherein the anode of the third diode is connected to the anode of the first diode;
        a first inductor having two ends, one of which is connected to both the cathode of the first diode and the positive output of the rectifier circuit;
        a second inductor having an end connected to the cathode of the second diode and an opposite end connected to the anode of the first diode and the anode of the third diode;
        a first capacitor having an end connected to the first inductor and an opposite end connected to the second inductor, the anode of the first diode and the anode of the third diode;
        a switch having an end connected to both the first inductor and the first capacitor and an opposite end connected to both the negative output of the rectifier circuit and the anode of the second diode;
        a fourth diode having an anode and a cathode, wherein the anode of the fourth diode is connected to both the cathode of the second diode and the second inductor, and the cathode thereof is connected to the cathode of the third diode;
        a third inductor having an end connected to both the cathode of the third diode and the cathode of the fourth diode;
        a second capacitor having an end connected to both the cathode of the third diode and the cathode of the fourth diode and an opposite end connected to the third inductor; and
        a third capacitor having an end connected to both the third inductor and the second capacitor and an opposite end connected to the cathode of the second diode, the second inductor and the anode of the fourth diode, wherein the third capacitor is connected to the loading in parallel.

2. The AC/DC converter of claim 1, wherein the active power factor correction circuit further comprises a fifth diode; the third inductor is electrically connected to both the cathode of the third diode and the cathode of the fourth diode through the fifth diode; the fifth diode has an anode connected to both the cathode of the third diode and the cathode of the fourth diode and a cathode connected to the third inductor.

3. The AC/DC converter of claim 1, wherein the first capacitor is a non-polarity capacitor.

4. The AC/DC converter of claim 1, wherein the second capacitor is a non-polarity capacitor.

5. The AC/DC converter of claim 1, wherein the second capacitor is a capacitor other than an electrolytic capacitor.

6. A method of correcting power factor with an active power factor correction circuit, wherein the active power factor correction circuit comprises a first diode, a second diode, a third diode, a first inductor, a second inductor, a first capacitor, a switch, a fourth diode, a third inductor, a second capacitor, and a third capacitor, wherein the first diode has an anode and a cathode, wherein the cathode of the first diode is connected to the positive output of the rectifier circuit; the second diode has an anode and a cathode, wherein the anode of the second diode is connected to the negative output of the rectifier circuit; the third diode has an anode and a cathode, wherein the anode of the third diode is connected to the anode of the first diode; the first inductor has two ends, one of which is connected to both the cathode of the first diode and the positive output of the rectifier circuit; the second inductor has an end connected to the cathode of the second diode and an opposite end connected to the anode of the first diode and the anode of the third diode; the first capacitor has an end connected to the first inductor and an opposite end connected to the second inductor, the anode of the first diode and the anode of the third diode; the switch has an end connected to both the first inductor and the first capacitor and an opposite end connected to both the negative output of the rectifier circuit and the anode of the second diode; the fourth diode has an anode and a cathode, wherein the anode of the fourth diode is connected to both the cathode of the second diode and the second inductor, and the cathode thereof is connected to the cathode of the third diode; the third inductor has an end connected to both the cathode of the third diode and the cathode of the fourth diode; the second capacitor has an end connected to both the cathode of the third diode and the cathode of the fourth diode and an opposite end connected to the third inductor; the third capacitor has an end connected to both the third inductor and the second capacitor and an opposite end connected to the cathode of the second diode, the second inductor and the anode of the fourth diode, wherein the third capacitor is connected to the loading in parallel; the method comprising the steps of:

A. conducting the switch to let the DC power supply charge the first inductor with a DC, the first capacitor charge the second inductor to make the second inductor have a stored energy, and the third inductor, the second inductor and the third inductor provide energy to the loading;

B. cutting off the switch and conducting the first diode to let the first inductor provide energy to the first capacitor, and keeping transmitting the stored energy of the second inductor to the third capacitor;

C. conducting the fourth diode to let the second capacitor and the third inductor provide energy to the third capacitor to provide energy into the loading;

D. keeping providing energy from the second capacitor and the third inductor to the third capacitor to provide energy into the loading as the first diode is cut off after the first inductor finishing providing energy to the first capacitor.

7. The method of claim 6, further comprising the step of repeating the step A to the step D after the step D.

8. The method of claim 6, wherein the second inductor transmits the stored energy to the third capacity through a resonant circuit, which is formed by the second capacitor and the third inductor.

9. The method of claim 6, wherein the fourth diode conducts when a voltage drop of the third inductor is higher than a voltage drop of the third capacitor.

10. The method of claim 6, wherein the first inductor keeps providing energy to the first capacitor in the step C.

* * * * *